United States Patent [19]

Ramer

[11] Patent Number: 5,385,001
[45] Date of Patent: Jan. 31, 1995

[54] ROLL-OFF TABLE APPARATUS AND METHOD

[76] Inventor: William E. Ramer, R.D. #1, Box 189, Kittanning, Pa. 16201

[21] Appl. No.: 97,440

[22] Filed: Jul. 26, 1993

[51] Int. Cl.$^6$ .......................................... B65B 11/04
[52] U.S. Cl. ........................................ 53/399; 53/211; 53/465; 53/587
[58] Field of Search .................. 53/587, 211, 399, 465, 53/461, 210, 214; 56/341; 414/381, 376

[56] References Cited

U.S. PATENT DOCUMENTS

| | | | |
|---|---|---|---|
| 2,724,225 | 11/1955 | Haidegger | 53/102 |
| 2,893,189 | 7/1959 | Lancaster | 53/198 |
| 4,232,501 | 11/1980 | Stackhouse | 53/399 |
| 4,259,286 | 3/1981 | Louis et al. | 264/555 |
| 4,343,132 | 8/1982 | Lawless, Jr. | 53/399 |
| 4,407,113 | 10/1983 | Core | 56/341 |
| 4,409,784 | 10/1983 | VanGinhoven et al. | 56/341 |
| 4,418,510 | 12/1983 | Lancaster, III et al. | 53/399 |
| 4,514,955 | 5/1985 | Mouser et al. | 53/64 |
| 4,563,854 | 1/1986 | Ackermann et al. | 53/118 |
| 4,606,172 | 8/1986 | Miller | 53/587 X |
| 4,641,484 | 2/1987 | Popelka | 53/399 |
| 4,646,984 | 3/1987 | Falstrup | 242/54 |
| 4,662,151 | 5/1987 | Mathes et al. | 53/587 |
| 4,676,048 | 6/1987 | Lancaster et al. | 53/399 |
| 4,691,497 | 9/1987 | Lancaster | 53/399 |
| 4,815,369 | 3/1989 | Akins | 99/533 |
| 4,827,699 | 5/1989 | Shauman | 53/587 |
| 4,827,700 | 5/1989 | Rampe et al. | 53/587 |
| 4,840,006 | 6/1989 | Humphrey | 53/64 |
| 4,841,716 | 6/1989 | Roymberg | 53/556 |
| 4,890,443 | 1/1990 | Diehm | 53/118 |
| 4,891,930 | 1/1990 | Schaefer | 53/587 |
| 4,972,656 | 11/1990 | Haugstad | 53/176 |
| 4,986,057 | 1/1991 | Gainforth | 53/556 |
| 5,012,631 | 5/1991 | Hostetler et al. | 53/588 |
| 5,042,225 | 8/1991 | Drury et al. | 53/211 |
| 5,046,296 | 9/1991 | Drury et al. | 53/587 X |
| 5,048,271 | 9/1991 | Walton | 53/587 |
| 5,105,607 | 4/1992 | Gratton | 53/587 |
| 5,129,215 | 7/1992 | Gratton | 53/587 |

FOREIGN PATENT DOCUMENTS 2241484  4/1991  United Kingdom .

Primary Examiner—James F. Coan
Attorney, Agent, or Firm—Douglas G. Glantz

[57] ABSTRACT

The disclosed packaging invention provides gentle article handling to protect the integrity of thin film wrapping. A turnable roll-off wrapping table tilts and discharges the wrapped article in combination with means for lowering the height of a roll-off article platform or holder on the table as it is tilted such that wrapped article discharge is performed at a reduced discharge height. The reduced wrapped article discharge height is low enough to discharge a large wrapped bale of silage gently to the ground. In one aspect, the large wrapped bale is discharged at a height of less than about 20 inches and at a specified discharge tilt angle from the vertical of about 47 degrees, plus or minus about 5 degrees.

Rollers positioned on a front end of the turnable roll-off wrapping table and at least one profile hinge, connected to the rear end of the wrapping table and at its other end to the chassis frame, lower the rear end of a wrapping platform as the wrapping platform extends and tilts along the chassis frame. A stop block positioned at a specified table extension distance redirects the lateral extension of the turnable roll-off wrapping table along the chassis through an increased tilting rate. A stop limit securing hook secures the retracted turnable roll-off wrapping table on the chassis and incudes an automatic lock on the stop limit hook. Automatic cut and hold means provide for cutting wrapping material at the specified tilting angle.

16 Claims, 5 Drawing Sheets

ROLL-OFF TABLE APPARATUS AND METHOD

BACKGROUND OF THE INVENTION

1. Technical Field

This invention relates to a roll-off table material handling, discharge apparatus and method. In one aspect, the invention relates to a roll-off table for thin film packaging of wrapped round bales for ensilage.

BACKGROUND

Ensilage involves storing green fodder for later use. For example, green fodder of hay, grass, straw, or the like for cattle, sheep, horses, or other domesticated farm animals can be grown and produced throughout a growing season at a rate faster than the farm animals can consume it. Accordingly, the fodder must be stored for later use, such as for use during winter or any other such non-growing season.

Ensilage typically involves packing green fodder in a silo without drying to preserve it for later use. Ensilage in a silo requires the construction of appropriate sheltering structures protect and keep the silage from exposure to the elements.

A relatively recent development provides a more efficient alternative to the expensive construction and maintenance of silos. Large round bales are being seen more and more around the countryside today. Large round bales are produced from the green fodder as a way to pack and preserve silage in a compacted, densified form. The densified, large round bales have been developed as a way to put the silage into a condition to withstand exposure to the elements, including to shed rain water or other natural precipitation, and to reduce oxidation even though the round bales are exposed to the weather without a silo or barn for protection.

Wrapping the round bales in a plastic film will reduce losses attributable to exposure to the elements by as much as 20–25% or more of the silage in the bale. Further, wrapping the round bales in a plastic film can provide a more effective substitute to silos for injecting preservative chemicals or for encouraging fermentation by anaerobic bacteria to preserve the silage for later use. In these cases, it is essential to exclude atmospheric air, and to enclose the bales in a hermetically sealed plastic wrapping.

The first attempts at covering the large round bales involved employing a large communal blanket of plastic covering which was pulled over the bales.

Individually wrapped round bales provide advantages of superior integrity in the packaging including features which create independent hermetically sealed enclosures, and they provide for a more efficient distribution of the silage when in comes time for its distribution as animal feed. The individually wrapped bales maintain the integrity of the bales and prevent silage deterioration such as would result from a singular cut or tear in the communal blanket. The individually wrapped round bales also can be more readily transported and do not require rewrapping when not all of the round bales covered by a communal blanket are required for use and distribution as animal feed.

INTRODUCTION TO THE INVENTION

In silage storage today, round bales are individually wrapped conventionally and discharged from the wrapper apparatus by dropping or dumping the bales from the bale wrapper to the ground. Conventional bale wrappers generally drop the bales from heights above the ground typically of forty (40) inches or higher. Dropping the bales from the bale wrapper to the ground from these heights causes inevitable damage to the sealed bales. The dropped bales have been observed to "burp" or expel air as trapped air is forced out of the wrapping upon impact. Such a burp or release of trapped air is undesirable because it breaks the layers of stretch wrap which had been "glued down," leaving the bales unsealed. The hermetic seal, which is so important for the superior integrity of the packaging of the individually wrapped bales, thereby is breached and destroyed by dropping the wrapped bales from the bale wrapper to the ground. Such a breach of the hermetically sealed wrapping destroys the necessary conditions for proper anaerobic fermentation.

Numerous fall dampers, ramps, or bumpers have been and are being used with mixed results to discharge the wrapped bale from the round bale wrapper to the ground.

Fall dampers also can be viewed as including bumpers. Fall dampers and bumpers operate by dropping the bail through a double impact, one impact on the damper or bumper and a second impact on the ground. The double impact causes tears and a double burp or a release of air from the wrapped bail. The impact on the ground also causes tears in the wrapped bail caused by crop stubble or surface imperfections on the ground.

Fall dampers have the drawbacks of wrapping tears, double burp wrapping failures, mechanical problem malfunctions, excessive stress on the wrapper, and high maintenance. The drawbacks or problems of the fall dampers are associated primarily with stress loads placed on the wrapped bale as well as the apparatus of the wrapper related to the impact caused when the bail hits the fall damper. Typically, the impact caused when the bail hits the fall damper is a hard impact. In addition to wrapping tears and double burp wrapping failures, the stresses caused by the hard impact must be absorbed by the wrapper apparatus structure which causes the mechanical problem malfunctions, excessive stress on the wrapper, and high maintenance.

Ramps used to discharge the wrapped bale from the bale wrapper to the ground put a rolling motion on the bale as it is released from the wrapper causing problems of unwinding wrap material and danger of injury from out of control bales as well as destroying the seal of the wrapping. The rolling motion of the bale on the ground causes crop stubble to puncture the wrapping along the circumference of bale.

Bumpers used to discharge the wrapped bale from the bale wrapper to the ground do nothing more than employ an intermediate impact to break the fall of the bale as it is discharged from the wrapper to the ground. In breaking the fall, the bumpers act to produce the same destructive effects on the wrapped bale when the bale hits the bumper as when the bale hits the ground. The intermediate impact also places substantial stress on the wrapper apparatus with destructive results to the wrapper.

U.S. Pat. No. 5,105,607 discloses a rotatable bale platform on a stationary support frame. Upon completion of the wrapping, the platform is raised allowing the wrap holder to reengage the wrap between the bale and the wrap dispenser. Continued tilting of the platform causes the bale to be discharged to the ground severing the wrap while leaving it attached to the wrap holder.

After discharging the bale, the table is lowered from the raised position.

U.S. Pat. No. 5,048,271 discloses a machine for wrapping cylindrical bales including a pair of semirollers which are raised by a subframe while a rear roller remains undisplaced so that the raised wrapped bale is tipped rearwardly over the rear roller and onto the ground by power from a hydraulic ram.

U.S. Pat. No. 5,042,225 discloses a bale wrapper and an extensible hydraulic ram capable of tilting a platform pivotally connected to a frame to discharge the load.

U.S. Pat. No. 5,012,631 discloses a discharge ramp and roller attached to a frame structure and space beneath the ramp to allow the frame structure to roll along the ground during discharge of bales from the wrapping apparatus.

U.S. Pat. No. 4,662,151 discloses a rotatable platform having a rock shaft on its underside journaled in bearings mounted at the rear end of a frame for pivotal movement of the platform. On completion of a terminal one-half revolution of the platform, the ground side of the bale is located so that on tilting of the platform to unload the bale, the ground side is in ground engagement to maintain the terminal ends of the two wrappings against the table. A double acting hydraulic cylinder is connected to a rock arm (not shown) on the rock shaft.

U.S. Pat. No. 4,641,484 discloses a bale unloader consisting of a large roller journaled between a yoke mounted on one end of a swinging arm on the opposite side of the wrapping table from a bale handler.

U.S. Pat. No. 4,972,656, issued to Haugstad and assigned to Underhaug A/S of Naerbo, Norway, discloses a round bale wrapper having a round bale table and packing sheet dispenser for turning and wrapping a round bale about a horizontal and vertical axis. The Haugstad patent shows a tiltable table for a manual cut and hold device for cutting the sheet between the wrapped round bale, secured in place and held on the table, and the sheet dispenser. The round bale table is tiltable relative to a chassis by means of a working cylinder, not shown (Col. 2, lines 52–54).

Conventional wrappers, including but not limited to wrappers as shown in these patents and as used for wrapping round bales of silage, have drawbacks and deficiencies in the means and method for discharging the wrapped bales from the wrapper apparatus to the floor or ground. The above mentioned wrappers have several disadvantages to their means of discharge. U.S. Pat. No. 4,972,656 discloses a wrapper which raises the bale excessively high to accommodate film gathering. This excessive height leads to excessive impact damage. Other commercially available wrappers attempt to maintain low table heights by using small tires which compact the soil excessively. However, the shear bulk of the components make certain discharge heights unacceptable without gentle discharge apparatus. Mechanical interference, excessive expense, and incompatibility of components dictate the need for novel bale discharge apparatus and method.

Accordingly, a new wrapper apparatus is needed to overcome the deficiencies of conventional wrappers and bale discharge mechanisms.

It is an object of the present invention to provide novel wrapping apparatus and method for gently handling or discharging a wrapped article from wrapping apparatus in thin film packaging applications.

It is another object of the present invention to provide novel material handling apparatus and method for protecting the integrity of the seal for wrapped articles in thin film packaging applications and for providing efficiency in storage space utilization for such wrapped articles.

It is an object of the present invention to provide novel wrapping apparatus and method for handling or discharging bales gently in thin film packaging applications for wrapping large round bales for ensilage.

It is another object of the present invention to provide novel wrapped bale material handling apparatus and method for protecting the integrity of the seal for wrapped large round bales for ensilage.

It is another object of the present invention to provide novel wrapped bale material handling apparatus and method for providing efficiency in storage space utilization for wrapped large round bales for ensilage.

These and other objects of the present invention will become apparent from the detailed description which follows.

SUMMARY OF THE INVENTION

The present invention apparatus and method for providing packaging article handling include a roll-off wrapper table having an article holder for supporting, handling, and discharging an article, including a large article, to be wrapped, e.g., such as in one aspect, a thin film wrapped bale of silage. A chassis supports a turnable wrapping table, and means for tilting the turnable wrapping table are adapted to discharge the wrapped article from the turnable wrapping table, in combination with means for lowering the height of a roll-off article holder as it is tilted such that wrapped article discharge can be performed at a reduced wrapped article discharge height. In one aspect, the reduced wrapped article discharge height is low enough to discharge a large wrapped bale of silage gently from the roll-off article (bale) holder to the ground and, in one aspect, at a height of less than about 20 inches. A specified tilting discharge angle provided by the means for tilting and by the means for lowering includes a discharge angle from the vertical of about 47 degrees, plus or minus about 5 degrees.

In one aspect, the means for lowering include rollers on the turnable roll-off wrapping table for extending and retracting the table along the chassis and means for suspending one end of the turnable roll-off wrapping table as it extends along the chassis. The rollers are positioned on a front end of the turnable roll-off wrapping table, and the means for suspending include at least one profile hinge connected to a rear end of the turnable roll-off wrapping table. In one aspect, the profile hinge is connected at its one end to the rear of the turnable roll-off wrapping table base and further is connected at its other end to the chassis frame in such a manner so as to lower the rear end of a wrapping platform as the wrapping platform extends along the chassis frame. The means for lowering include means for controlling movement of the turnable roll-off wrapping table as it extends to a specified lateral extension distance in relation to tilting. In one aspect, the means for controlling include a stop block positioned at a specified extension distance to redirect lateral extension of the turnable roll-off wrapping table through an increased tilting rate along the chassis. The means for tilting include hydraulic means for pushing or pulling one end of the turnable roll-off wrapping table. A stop limit hook secures the retractable turnable roll-off wrapping table on the chassis and includes an automatic lock on the stop limit hook. Automatic cut and hold means provide for cutting wrapping material at the specified tilting angle.

DETAILED DESCRIPTION

Figure 1:
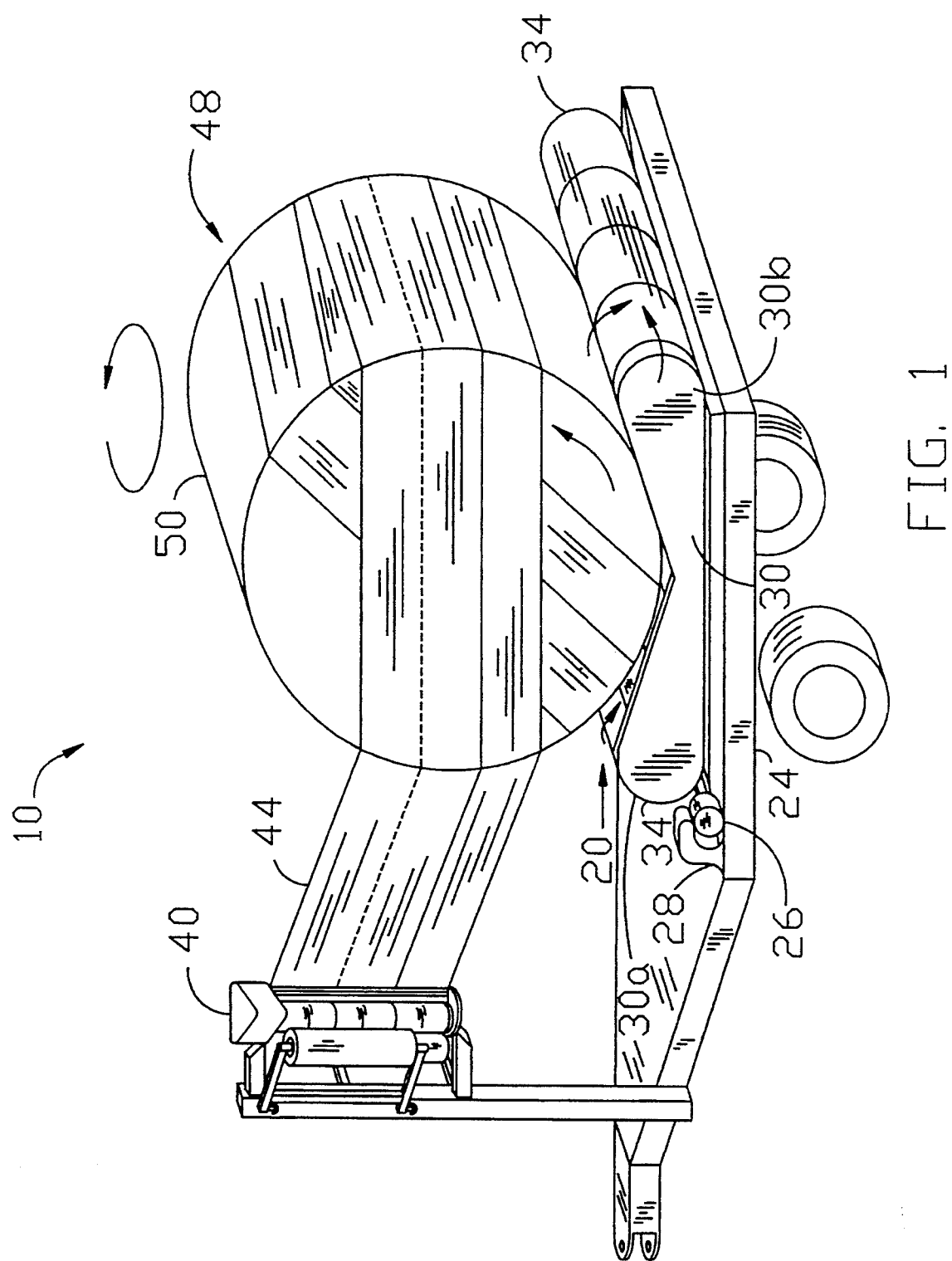
FIG. 1 shows a side perspective view of a wrapping apparatus according to the present invention for wrapping round bales.

Referring now to FIG. 1, wrapping apparatus 10 includes roll-off table apparatus 20 in accordance with the present invention. A perspective view is shown incorporating a turnable wrapping table 30 and prestretcher wrapping apparatus 40 for wrapping large round bales for ensilage. Wrapping apparatus 40 dispenses a web or film of packing sheet material 44 in overlapped condition as it leaves prestretcher 40 for wrapping round bale 50. Round bale 50 is held on rotating turnable wrapping table 30, which rotates as indicated in a generally counter-clockwise direction when viewed from above, with respect to chassis frame 24. Round bale 50 also can be revolved in a substantially vertical direction by rolling round bale 50 on rollers 34. Round bale 50 thereby is wrapped as it is turned on table 30 and as it is rolled on rollers 34 so that the round bale is revolved on a substantially horizontal axis by rollers 34 and simultaneously rotated on a substantially vertical axis by rotating table 30. The revolving and rotating round bale facilitates wrapping in successive overlaps of the film as it ms dispensed from prestretcher wrapping apparatus 40 and applied to round bale 50 through successive overlaps 48 of wrapping material.

The rotating table 30 positioned on chassis frame 24 provides the driving force for wrapping the article to be wrapped or the collection of unit packages to be wrapped by overlapping wrapping material 44 (which initially is put into a prestretched, overlapped condition by prestretcher 40) through successive wrapping overlaps 48 formed by successive passes of the wrapping material, each pass adjusted for a successive offset (overlap) of about one-third the total width equal to the 2-ply portion of the stretched laminated film to provide the successively offset and overlapped wrapping 48 of the article or unit packages to be wrapped.

The rotating wrapping table 30 is moved to achieve the successive offset and overlapped wrapping 48. The wrapping apparatus can be moved manually, electrically, or hydraulically through power transfer means such as acme screw, jack screw, chain, or hydraulic cylinder depending on the power source at hand and the speed required.

Rollers 26 positioned on either side of the roll-off table apparatus permit the turnable wrapping table 34 to roll along the top edge of chassis frame 24. Hooks 28 secure the rollers 26 when the table 30 is in its closed, fully retracted or wrapping position.

Figure 2:
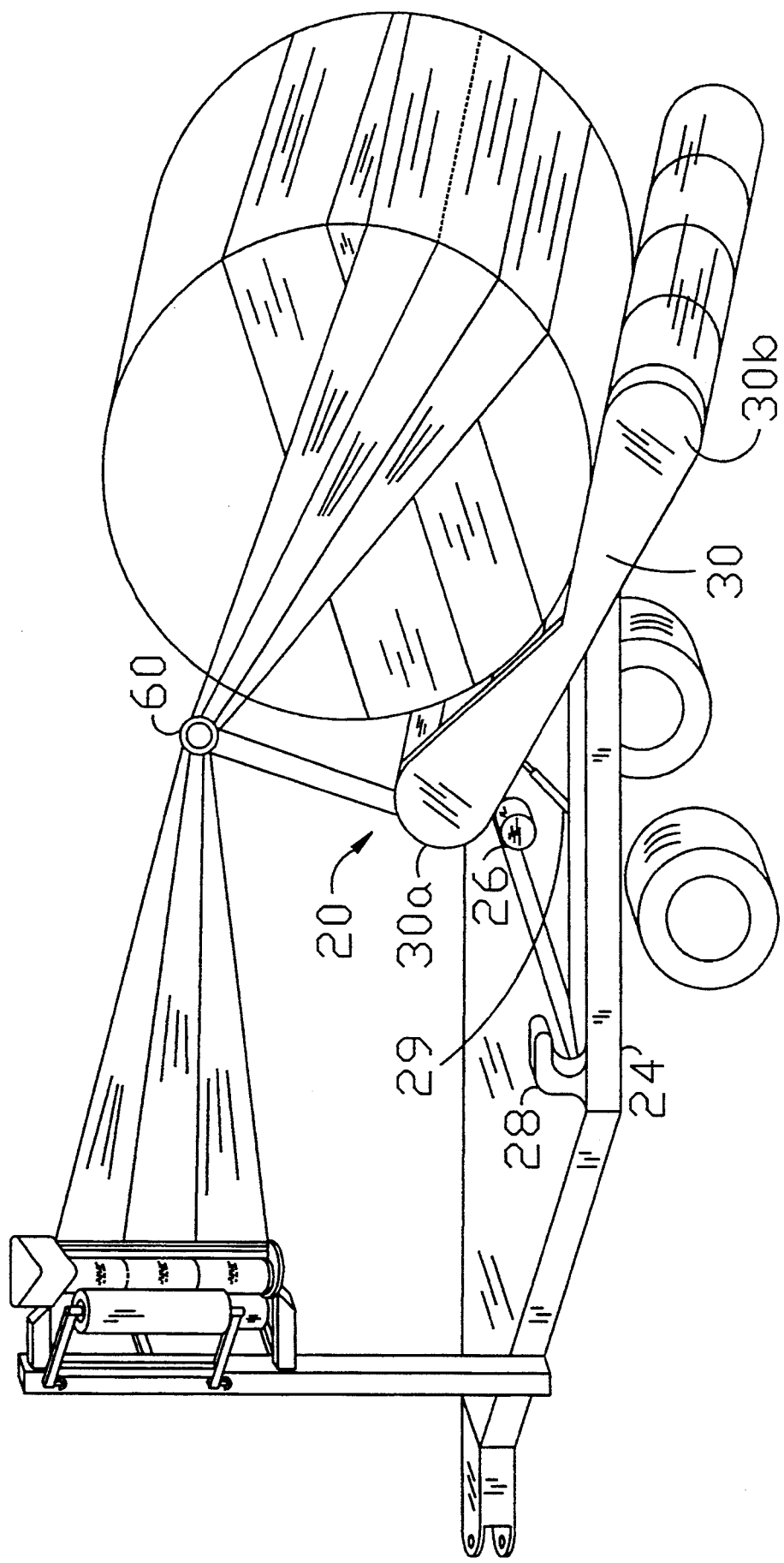
FIG. 2 shows a side perspective view of a wrapping apparatus according to the present invention in the discharge position.

Referring now to FIG. 2, roll-off table apparatus 20 is shown in its fully extended and lowered position. Table 30 has been extended along chassis frame 24 while riding on rollers 26 until reaching a predetermined extension distance at which point hydraulic cylinder 29 raises the front end 30a of table 30. Means for lowering as described in detail hereinbelow provide for a lowering of the rear end of table 30 as indicated at rear end 30b. Hydraulic cylinder 29 operates to extend and retract table 30 as it moves along chassis 24 on rollers 26 and further operates to tilt table 30 at and through the predetermined extension distance. An automatic cut and hold device 60 gathers the plastic wrapping material as the bale is tilted.

Figure 3:
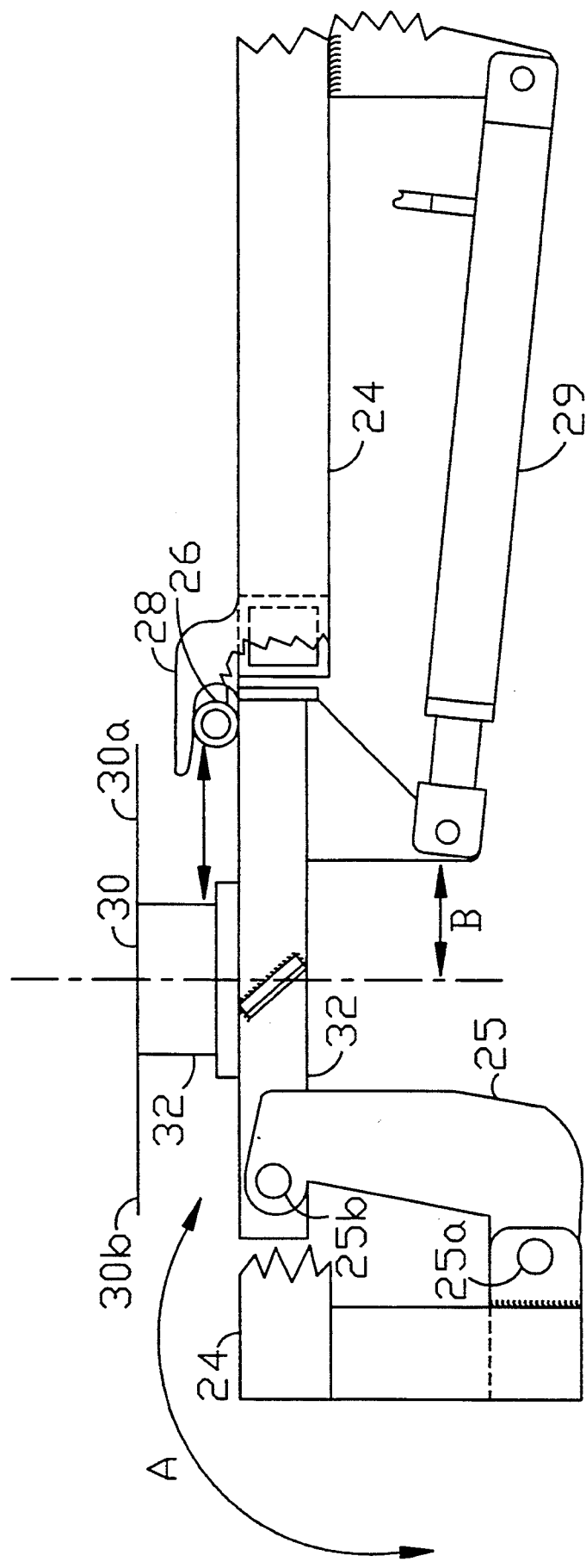
FIG. 3 is a side elevation view of a wrapping apparatus according to the present invention in the closed or wrapping position.

Referring to FIG. 3, turnable wrapping table 30 is indicated by schematic platform representation as resting on table base 32. Roller 26 for rolling table 30 and table base 32 along chassis frame 24 is shown locked in secured position in securing hook 28. Hydraulic cylinder 29 operates to retract the rollers to be secured under securing hooks 28. Hydraulic cylinder 29 is capable of extending the table 30 as it rolls on rollers 26 on chassis frame 24. The hydraulic cylinder thereby operates to extend and retract through extensible operation as indicated by B.

Profile hinge 25 is connected at 25a to chassis frame 24. Profile hinge 25 is connected at 25b to the rear end 30b of turnable wrapping table 30 and table base 32. As the hydraulic cylinder operates to extend the turnable wrapping table 30 to the rear, i.e., to the left as indicated in FIG. 3, profile hinge 25 moves the turnable wrapping table 30 and table base 32 through arc A.

Figure 4:
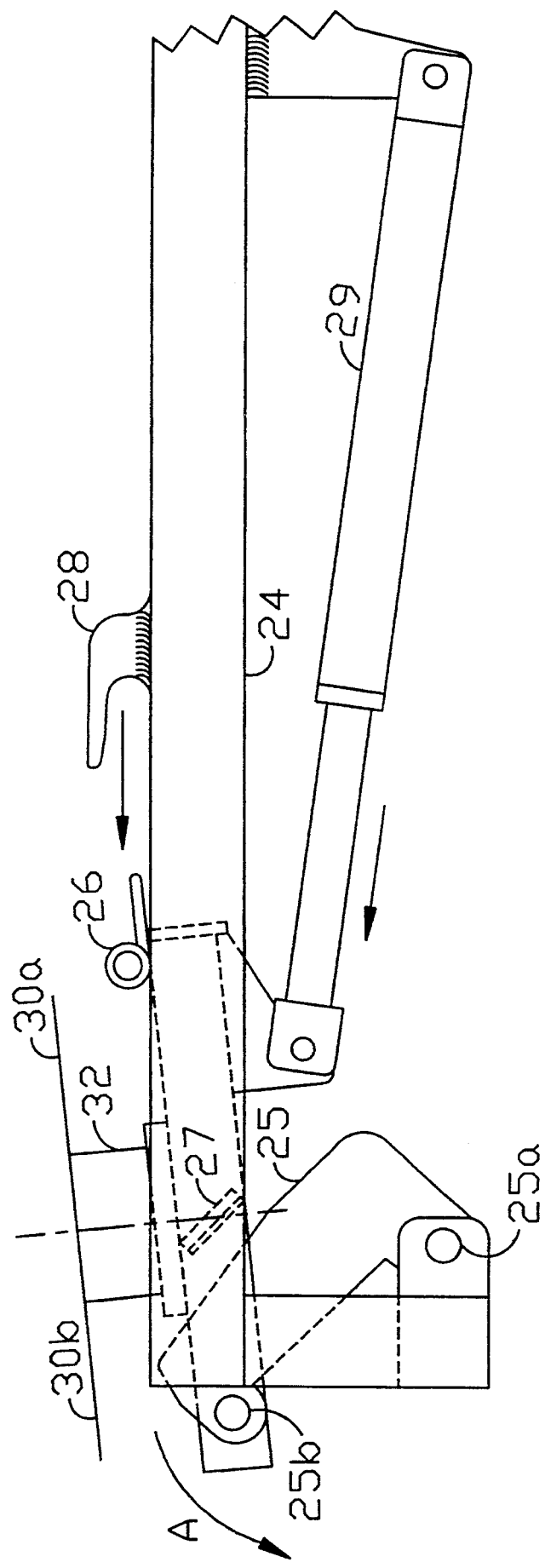
FIG. 4 is a side elevation view of a wrapping apparatus according to the present invention in a middle position.

Referring now to FIG. 4, hydraulic ram 29 has extended to a middle position. Rollers 26 have extended the table 30 on table base 32 along chassis frame 24 to a middle position. Profile hinge 25 has begun a lowering operation along arc A. Stop block 27 is seen positioned on chassis frame 24 in such a manner so as to be capable of coming into position to contact profile hinge 25. When stop block 27 contacts profile hinge 25, a redirected tilting operation will be performed by further extension of hydraulic cylinder 29.

Figure 5:
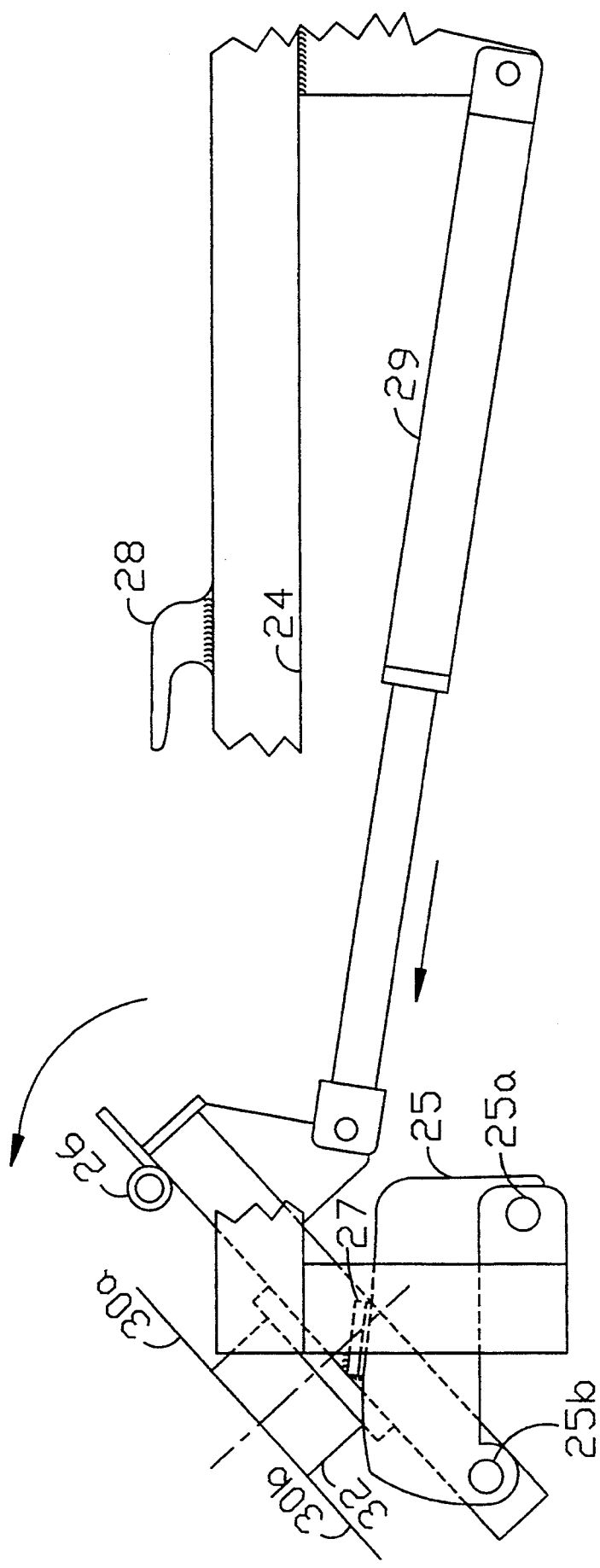
FIG. 5 is a side elevation view of a wrapping apparatus according to the present invention in the discharge position.

Referring now to FIG. 5, hydraulic cylinder 29 is seen in an extended, discharge position. Stop block 27 has contacted profile hinge 25 so that roller 26 has been lifted in an increased tilting rate from chassis frame 24 as the table 30 has been tilted to the rear and further has been lowered at table rear end 30b to a discharge height by the means for lowering, including in one preferred embodiment, profile hinge 25.

profile hinge 25 is connected at 25a to chassis frame 24. Profile hinge 25 is connected at 25b to the rear end 30b of turnable wrapping table 30 and table base 32. As hydraulic cylinder 29 pushes or extends to the rear, the turnable wrapping table bottoms out and is redirected by stop block 27 through an increased tilting, lifting the rollers 26 up from chassis frame 24 while lowering the rear end 30b of the turnable wrapping table 30.

Bale side holders or bobbins (not shown) keep the bale centered on the turnable wrapping table and minimize rotation with uncentered bales.

In this way, the bale wrapper of the present invention includes a turnable wrapping table having a bale platform or holder for supporting a bale of silage, a chassis for supporting the turnable wrapping table, means for tilting the turnable wrapping table adapted to discharge the bale from the turnable wrapping table, and means for lowering the height of the turnable wrapping table bale platform or holder as it is tilted such that bale discharge can be performed at a reduced bale discharge height. The reduced bale discharge height is low enough to discharge the bale gently to the ground. The reduced bale discharge height includes a height of less than about 25 inches. Preferably, the reduced bale discharge height comprises a height of less than about 20 inches.

The means for lowering of the present invention include rollers 26 on the turnable wrapping table 30 for extending and retracting the turnable wrapping table along chassis 24. The means for lowering further include means for suspending one end of the turnable wrapping table 30 as it extends along the chassis 24. In the preferred embodiment, the means for suspending the rear end 30b of turnable wrapping table 30 are provided by profile hinge 25. In the preferred embodiment, the rollers 26 are positioned on the front end 30a of the turnable wrapping table 30, and the means for suspending include at least one profile hinge 25 connected to rear end 30b of the combination turnable wrapping table 30 and table base 32.

The means for lowering further include means for controlling the means for lowering such that the turnable wrapping table 30 extends to a specified extension distance prior to being redirected to a more acute tilting rate from the horizontal. The means for controlling preferably include a stop block 27 positioned at a specified extension distance to redirect the lateral extension of the turnable wrapping table 30 along chassis 24.

The reduced bale discharge height is positioned at a specified tilting discharge angle provided by the means for tilting and the means for lowering. The specified tilting discharge angle is provided in the preferred embodiment by redirecting the tilting of the table through extension of hydraulic ram 29 when stop block 27 comes in contact with profile hinge 25, thereby employing the hydraulic cylinder 29 to redirect the tilt of table front 30a at an increased rate in an upward direction while lowering the rear 30b of turnable wrapping table. The specified tilting discharge angle preferably includes an angle from the vertical of about 47 degrees plus or minus about 5 degrees.

A stop limit securing hook as indicated by hook 28 in the drawings is provided for stopping and securing the retractable turnable wrapping table on the chassis. It has been found that stop limit securing hook 28 is important for providing stability to the turnable wrapping table as it is undergoing wrapping operation for wrapping large round bales. Bales such as are contemplated for wrapping in the apparatus and method of the present invention include large round bales which weigh as much as one (1) to one and one-half (1½) tons or more. Such a heavy bale produces significant stress and strain as it undergoes rotation on a vertical axis by turnable wrapping table 30 as well as revolution on the horizontal axis by rollers 24. Stop limit securing hooks 28 have been found to be an important feature to secure the wrapping table on its chassis to withstand and endure these significant stresses and strains during wrapping operations.

An automatic lock (not shown) is provided collateral to the stop limit securing hook, which automatic lock operates automatically by spring actuated action when rollers 26 are retracted completely within stop limit securing hooks 28. Such automatic lock aligns and indexes the turnable table cross member to hold the table in a precise position during roll-off and return. Automatic cut and hold means, as indicated in the drawings by cut and hold 60 as shown in FIG. 2, provide for cutting the wrapping material at the specified tilting discharge angle. It has been found that the cut and hold means 60 work with particular efficiency with the roll-off table of the present invention because all table and bale movements are precise and gentle, allowing for complete gathering and secure gripping of the film.

It has been found that the means for controlling the lateral extension of the turnable roll-off wrapping table as it extends to the rear of the bale wrapper of the present invention are important to provide a predetermined lateral extension distance prior to raising the table by redirecting table tilting to the particular specified tilting discharge angle. It is important to extend the turnable wrapping table to the rear only so far on rollers, and then to pick up the turnable wrapping table at an increased tilting rate from the horizontal by redirecting the tilting mechanism. In the preferred embodiment, the means for controlling the lateral extension distance are provided by a stop block as indicated by stop block 27 in the drawings. The positioning of stop block 27 is important so that the table stops and turns up at that particular specified lateral extension position when the turnable wrapping table bottoms out and then gets redirected in response to the further extension of the pushing and pulling means, e.g., such as provided by the hydraulic cylinder in the preferred embodiment. Otherwise, the hydraulic pushing and pulling system would come to a locked position with all of the connecting pins straight in line together. In this way, the turnable wrapping table is stopped and redirected at a particular specified lateral extension position and angle prior to further tilting up at the increased tilting rate in combination with lowering the rear, as opposed to continuing to roll laterally on the chassis as would otherwise occur without the stop block.

It further has been found that the turnable wrapping table should bottom out prior to reaching its critical discharge angle for discharging the bale from the wrapping apparatus to the ground. The critical discharge angle has been found to be 47 degrees from the horizontal plus or minus about 5 degrees. It was found important to bottom out before the critical discharge angle is reached because the momentum of the bale is checked momentarily, thereby enhancing the gentle "stepping off" motion of the bale as compared to power discharging as would otherwise occur.

If the table bottoms out too soon, the roll-off table discharge mechanism will not work properly because the critical discharge angle is reached too soon, causing "power discharge" of the bale. If the turnable wrapping table bottoms out too late, i.e., too far along in its extension distance along the chassis, then the roll-off table discharge mechanism will not work properly because the cylinder pin and hinge pin alignment eliminates the vertical lift, causing failure to discharge.

It has been found that it is possible to work the roll-off table machine without the stop block feature of the preferred embodiment of the present invention, but only if the hydraulic cylinder is set at a specified linear stroke angle pointed up. This specified linear stroke angle is provided by an initial angle of about 30 degrees from the horizontal. However, this application tends to force the front of the table upwards, requiring the use of a linear track over the rollers. The use of a total linear track roll-off system has been observed to result in erratic movement and "jiggling" during roll-off and during wrapping.

It has been found that it is important to latch down the turnable wrapping table with securing hooks on the front because the significant weight of the large bales, e.g., on the order of 1 to 1½ tons or more, causes the table to jiggle and/or oscillate, leading into an unmanageable operating condition.

The automatic cut and hold mechanism in combination with the roll-off table of the present invention includes provision for turning of the wrapping table at the proper position to gather the film. The film is gathered at the cut and hold device. With the roll-off table mechanism of the present invention, the apparatus provides not only for the front coming up, but also for the rear going down, and the film can be totally gathered at a preferred position before bale discharge.

An automatic lock system (not shown) is provided to lock the wrapping table under securing hooks as shown by securing hooks 28 in the drawings. The automatic lock system operates as the wrapping table rolls in and out of securing hooks 28. The moving (retracting) apparatus provides the power to urge the spring actuated automatic lock mechanism into the desired position.

It has been found that a plurality of profile hinges are preferred, the profile hinges connected in a one-piece weldment to form a roll-off weldment which is solidly locked together. Otherwise, the load on the table would jiggle and become unstable as it extends back along the chassis. Two or more profile hinges connected with a cross member fastened by one-piece weldment have been found to provide for smooth and stable operation of the roll-off table of the present invention.

A modified profile hinge used in combination with a bale lift cylinder, or bale load arm cylinder, permits the operation of the bale lift or load arm cylinder to lift the bale to be wrapped from the ground out to the side so as not to interfere with the profile hinge. In this way, a bale lift cylinder or load arm cylinder can lift the bale to be wrapped onto the wrapping table, and the roll-off table apparatus and system will work in the presence of such a bale lift or load arm cylinder.

The hydraulic cylinder of the present invention is the preferred means for pushing, pulling, and holding back the turnable wrapping table as it extends and retracts along the chassis. Such a hydraulic cylinder for extending and retracting a table containing or holding a large round bale should be provided by a heavy duty hydraulic cylinder having, e.g., by way of example in one embodiment, about a 24-inch stroke with about a 3-inch bore. The heavy duty size of the cylinder has been found to make an important difference for the desired gentle operation of the roll-off table. For example, it has been found that a 2-inch bore is too fast and does not work to provide a controllably smooth roll-off table operation. A heavy-duty hydraulic system also can be provided by a restrictor to restrict flow in the bore or to control flow by an auxiliary hydraulic pump. The important aspect is to provide for heavy duty hydraulic power to provide for a controllably smooth and gentle operation for discharging bales from the roll-off table to the ground.

The preferred embodiment for the apparatus and method of the present invention includes using heavy duty structural steel for the structural members of the apparatus. For example, ⅜-inch thick profiles of structural steel are used in the preferred embodiment. The structural steel preferably is provided by steel compositions characterized by high tensile strength. Lighter profiles have been found to fatigue under the significant side loads and stress provided by the turnable wrapping table in combination with the roll-off table discharge mechanism of the present invention.

In a preferred embodiment, the roll-off table of the present invention includes a wrapping platform for wrapping a bale of ensilage, a table base frame for supporting the wrapping platform, a chassis frame for supporting the table base frame, rollers on the front end of the table base frame for extending and retracting the wrapping platform to one end of the chassis frame, at least one profile hinge connected at its one end to the rear of the table base frame and further connected at its other end to the chassis frame wherein the profile hinge lowers the rear end of the wrapping platform as it extends along the chassis frame, and discharge means for discharging the bale when the wrapping platform is extended at a specified bale discharge height and a specified discharge angle. Discharge means preferably include means for redirecting the tilting of the wrapping platform at a specified lateral extension distance. The specified bale discharge height includes a height less than about 25 inches, preferably less than about 20 inches, and more preferably at a bale discharge height of about 19 inches or less. The specified discharge tilting angle is an angle from the vertical of about 47 degrees plus or minus abut 5 degrees.

The method of the present invention includes discharging a wrapped bale of silage from a turnable wrapping table by providing a turnable wrapping table for wrapping and supporting a bale of silage, tilting the turnable wrapping table, lowering one end of the turnable wrapping table as it is tilted, and discharging the wrapped bale at a reduced bale discharge height, preferably less than about 20 inches from the floor or ground. The method of the present invention includes initially extending the turnable wrapping table to one end of a supporting chassis frame prior to tilting and lowering, transitioning to extending the turnable wrapping table laterally to the rear while tilting and lowering, and a final extending to a discharge position including tilting at an increased rate and lowering while minimizing lateral extension of the turnable wrapping table to the rear of the chassis.

In the preferred embodiment, the bale wrapper roll-off table of the present invention includes a turnable wrapping table having a bale platform or holder for supporting a bale of silage, a chassis for supporting the turnable wrapping table, heavy duty hydraulic means for pushing or pulling one end of the turnable wrapping table to tilt it and to discharge the bale, rollers positioned on the front end of the turnable wrapping table for extending and retracting it along the chassis, means for suspending one end of the turnable wrapping table as it extends along the chassis and as it is tilted including a plurality of profile hinges connected as a solid member by a solid weldment cross member and further connected to a rear end of the turnable wrapping table, such that bale discharge can be performed gently to the ground at a reduced bale discharge height of less than about 20 inches and at a specified tilting discharge angle at an angle from the vertical of about 47 degrees plus or minus 5 degrees, a stop block positioned at a specified extension distance to stop the lateral extension of the turnable wrapping table such that the turnable wrapping table extends to a specified extension distance prior to redirecting or increasing the tilting rate and angle, a heavy duty stop limit securing hook for stopping and securing the retractable turnable wrapping table on the chassis, an automatic lock on the stop limit securing hook, and cut and hold means for cutting wrapping material at the specified tilting angle.

The apparatus and process of the present invention provide a wrapper adapted to be disposed or positioned to wrap an article as the article rotates. In a preferred embodiment, the article will rotate about at least one axis. In the case of a round bale wrapper, the bale can be rotated about a vertical axis as it is positioned on a rotating wrapping table, and the bale can be further revolved or rotated about a substantially horizontal axis on rollers positioned on the wrapping table.

Alternatively, the apparatus and process of the present invention can provide a wrapper which is adapted to be disposed or positioned to be moved or to revolve around a article held in stationary position as the article is wrapped. The wrapping apparatus can be adapted to move around the article to be wrapped in an embodiment (not shown) wherein the article to be wrapped remains stationary and the wrapping apparatus revolves around the stationary article. The wrapping apparatus can be positioned on a swinging arm, on a track, or on a revolving carriage such as in a large track ring.

The present invention can be applied to general packaging applications, such as for wrapping crates, packages, lumber stacks, or other packaging applications.

In another embodiment (not shown) for wrapping articles including elongated articles such as lumber, the wrapping apparatus can be disposed to form a tunnel means, e.g., such as in a ring or hoop means, for draping sheet film over the article to be wrapped as it passes through the tunnel means for dispensing the sheet film by rotating wrapping over the article to be wrapped.

The packing sheet film or wrapping material can be provided by a plastic wrapping material such as polyethylene having a thickness, by way of one example, on the order of about 1 mil. In one example, the packing sheet or wrapping material preferably includes an ultraviolet inhibitor for maintaining the integrity of the film as it provides service in the field under exposure to ultraviolet rays. Alternative plastic wrapping materials can be provided by sheets of polyamide, polybutene, polypropylene, polyvinylchloride, or similar materials as well as polyethylene, copolymers, or mixtures of these plastic materials.

The plastic sheet films have a resiliency which keep the wrapped object under tension. The tension or force covering the object to be wrapped depends on the modulus of elasticity of the particular plastic material sheet after stretching and further depends on the yield stress of the sheet wrapping. Suitable plastic sheet thin films are provided commercially as Silaflex or Sunfilm as available from AEP Film Company located at South Hackensack, N.J.

The novel round bale wrapper of the present invention in a preferred embodiment employs at least two film rolls, e.g., such as dual rolls of 20 inches width each. The dual rolls preferably overlap by ten to forty percent, e.g., such as by about 10 inches, in one example, thereby providing a 30 inches wrap in one pass around the bale with a thirty-three percent overlap in the form of a 10 inches 2-ply overlap. More preferably, the dual rolls overlap at least by about twenty to thirty percent and, more preferably, by at least about twenty-five percent.

In the operation of the present invention, the roll-off table discharge mechanism goes with the wrapped bale and carries the bale to provide a gentle discharge to the ground. With conventional bale discharge mechanisms available prior to the present invention, if the table turned a little, it typically hit the bale. As auxiliary operations were performed, these auxiliary operations also had the propensity to come in contact with the bale, usually with destructive results. For example, rollers or belts or other auxiliary mechanical devices had this propensity to come in contact with the bale, usually causing destructive harm to the hermetic seal of the wrapping on the bale. In the operation of the roll-off table of the present invention, the wrapping table is adapted to go with the bale and carry the bale to provide a gentle discharge to the ground, eliminating the destructive contact with other mechanical edges of the wrapping apparatus or ancillary devices.

The roll-off table of the present invention operates in combination with its required features to discharge and deposit a wrapped bale of silage gently on the ground. The roll-off table of the present invention eliminates burps or the expelling of air forced out of a wrapped bale as it is squashed when hitting the ground as otherwise occurs with conventional bale discharge devices available previously. The roll-off table of the present invention further provides for a discharge and deposit of the wrapped bale in such a way that it does not bounce around or tear the wrapping material as was experienced with conventional discharge devices available previously. The roll-off table of the present invention eliminates bale rolling on the ground, minimizes damage to the bale wrapping attributable to stubble damage, and prevents the wrapped bales from rolling away as occurred with conventional ramp discharge devices available previously.

The roll-off table of the present invention has operated to bring down a large wrapped round bale of silage to a bale discharge height of about 19 inches or less depending on the terrain. Moreover, bales are discharged and deposited gently from the wrapping apparatus to the ground.

It has been found that the height of the discharge can be varied by changing the length of the hydraulic cylinder and/or the pin spacings on the profile hinge of the present invention. The particular parameters for the apparatus should be determined and provided in accordance with the specifications of the diameter of the bales to be wrapped and the size of the wrapping table including wrapping roller diameter (for revolving the bale) and wrapping table configuration.

It has been found that the roll-off table of the present invention can lay the bale on the ground with essentially no harm to the bale. Since the roll-off table provides for gentle discharge of the bale to the ground, the roll-off table of the present invention further can lay the bales against one another to form a row of wrapped bales or to group the bales without harming adjacent wrapped bales. It has been found that the roll-off table of the present invention operates in a manner fully superior to fall dampers or other conventional bale discharge methods which have a propensity to rip the film on the previous wrapped bale in a row as the newly wrapped bale is dropped and placed in the row of wrapped bales. To overcome this destructive propensity in conventional bale discharge practices, spaces must be provided or left between bales in a row from the previously dropped bale to the newly wrapped bale in the row. The roll-off table of the present invention, on the other hand, overcomes this problem and permits bales to be grouped together and uniformly placed in a row with the newly wrapped bale immediately adjacent to the previously wrapped and dropped bale in the row. Moreover, the newly dropped bale can be placed directly on the tail of the previously wrapped bale, and one mode of operation thereby provides an automatic tuck to the bale wrapping tail of the previous bale in the row. Such operation is not possible with the fall damper when spaces are required to be left between adjacent bales in a row.

The wrapping apparatus of the present invention provides several advantages of wrapping and ease of use over conventional bale discharge systems and row-forming procedures. Shorter times and space saving features of the present invention are critically important to the farmer because of vagaries of the weather. The window of opportunity for wrapping typically is limited, and any savings or efficiencies of time and space become very valuable to the farmer wrapping large volumes of green fodder for ensilage.

Although the invention has been illustrated by the preceding detailed description, it is not intended to be construed as being limited to the specific preferred embodiments employed therein.

Whereas particular embodiments of the invention have been described hereinabove, for purposes of illustration, it will be evident to those skilled in the art that numerous variations of the details may be made without departing from the invention as defined in the appended claims.

What is claimed is:

1. A bale wrapper, comprising:
   a. a turnable wrapping table having a bale platform or holder for supporting a bale of silage;
   b. a chassis for supporting said turnable wrapping table;
   c. means for tilting said turnable wrapping table adapted to discharge said bale from said turnable wrapping table at a specified tilting discharge angle from the vertical of about 47 degrees, plus or minus about 5 degrees; and
   d. means for lowering the height of said turnable wrapping table bale platform or holder as it is tilted such that bale discharge can be performed at a reduced bale discharge height low enough to discharge said bale gently to the ground.

2. A bale wrapper as set forth in claim 1, wherein said reduced bale discharge height comprises a height of less than about 25 inches.

3. A bale wrapper as set forth in claim 2, wherein said reduced bale discharge height comprises a height of less than about 20 inches.

4. A bale wrapper as set forth in claim 3, wherein said means for lowering comprises:
   a. rollers on said turnable wrapping table for extending and retracting said turnable wrapping table along said chassis; and
   b. means for suspending one end of said turnable wrapping table to a lower position as it extends along said chassis.

5. A bale wrapper as set forth in claim 4, wherein said rollers are positioned on a front end of said turnable wrapping table and said means for suspending comprises at least one profile hinge connected to a rear end of said turnable wrapping table.

6. A bale wrapper as set forth in claim 5, wherein said means for lowering comprises means for controlling said means for lowering such that said turnable wrapping table extends to a specified extension distance and redirects table tilting to an increased tilting rate from the horizontal.

7. A bale wrapper as set forth in claim 6, wherein said means for tilting comprises hydraulic means for pushing or pulling one end of said turnable wrapping table; and said means for controlling comprises a stop block positioned at a specified extension distance to redirect lateral extension of said turnable wrapping table along said chassis to said increased tilting rate from the horizontal.

8. A bale wrapper as set forth in claim 7, further comprising a stop limit securing hook for stopping and securing the retractable turnable wrapping table on said chassis.

9. A bale wrapper as set forth in claim 8, further comprising an automatic lock on said stop limit securing hook.

10. A bale wrapper as set forth in claim 9, further comprising cut and hold means for cutting wrapping material at said specified tilting angle.

11. A roll-off table, comprising:
    a. a wrapping platform for wrapping a bale of ensilage;
    b. a base frame for supporting said wrapping platform;
    c. rollers on the front end of said wrapping platform for extending and retracting said wrapping platform to one end of said base frame;
    d. a profile hinge connected at its one end to the rear of said wrapping platform and further connected at its other end to said base frame, wherein said profile hinge lowers said rear end of said wrapping platform as the wrapping platform extends along said base frame; and
    e. discharge means for discharging said bale when said wrapping platform is extended at a specified bale discharge height and at a specified discharge angle.

12. A roll-off table as set forth in claim 11, wherein said discharge means for discharging said bale comprises means for tilting said wrapping platform through a specified lateral extension distance.

13. A roll-off table as set forth in claim 12, wherein said specified bale discharge height comprises a height of less than about 25 inches.

14. A roll-off table as set forth in claim 13, wherein said specified tilting angle comprises an angle from the vertical of about 47 degrees, plus or minus about 5 degrees.

15. A method of discharging a wrapped bale of ensilage from a turnable wrapping table, comprising:
    a. providing a turnable wrapping table for wrapping and supporting a bale of ensilage;
    b. tilting said turnable wrapping table;
    c. lowering one end of said turnable wrapping table as if is tilted;
    d. discharging said wrapped bale of ensilage from said turnable wrapping table at a discharge height less than about 20 inches from the floor or ground; and
    e. extending said turnable wrapping table to one end of a supporting chassis frame prior to increasing tilting rate with said lowering.

16. A bale wrapper roll-off table, comprising:
    a. a turnable wrapping table having a bale platform or holder for supporting a bale of silage;

b. a chassis for supporting said turnable wrapping table;
c. heavy duty hydraulic means for pushing or pulling one end of said turnable wrapping table to tilt said turnable wrapping table and adapted to discharge said bale from said turnable wrapping table;
d. rollers positioned on a front end of said turnable wrapping table for extending and retracting said turnable wrapping table along said chassis;
e. means for suspending one end of said turnable wrapping table as it extends along said chassis and as it is tilted, comprising a plurality of profile hinges connected as a solid member by a solid weldment cross member and further connected to a rear end of said turnable wrapping table, such that bale discharge can be performed gently to the ground at a reduced bale discharge height of less than about 20 inches and at a specified tilting discharge angle provided by said means for lowering at an angle from the vertical of about 47 degrees, plus or minus about 5 degrees;
f. a stop block positioned at a specified extension distance to redirect lateral extension of said turnable wrapping table such that said turnable wrapping table first extends to a specified extension distance and then is tilted at an increasing tilting rate;
h. a heavy duty stop limit securing hook for stopping and securing the retractable turnable wrapping table on said chassis;
i. an automatic lock on said stop limit hook; and
j. cut and hold means for cutting wrapping material at said specified tilting angle.

\* \* \* \* \*